United States Patent

Sekiguchi, deceased et al.

Patent Number: 5,184,705
Date of Patent: Feb. 9, 1993

[54] ELECTROMAGNETIC CLUTCH

[75] Inventors: Yuzo Sekiguchi, deceased, late of Kiryu, by Nabuko Sekiguchi, aexecutrix; Hirokazu Murayama, Kiryu, all of Japan

[73] Assignee: Ogura Corporation, Japan

[21] Appl. No.: 729,925

[22] Filed: Jul. 15, 1991

[30] Foreign Application Priority Data

Jul. 16, 1990 [JP] Japan .................. 2-74362[U]
Jul. 17, 1990 [JP] Japan .................. 2-75265[U]

[51] Int. Cl.⁵ ............................ F16D 27/10
[52] U.S. Cl. .................. 192/84 C; 192/106.1; 464/90
[58] Field of Search .......... 192/84 C, 84 B, 106.1; 464/180, 90, 92

[56] References Cited

U.S. PATENT DOCUMENTS

| | | | |
|---|---|---|---|
| 2,853,165 | 9/1958 | Walter et al. | 192/84 C X |
| 3,036,680 | 5/1962 | Jaeschke | 192/84 C |
| 3,307,669 | 3/1967 | Klinkenberg | 192/84 C |
| 3,774,739 | 11/1973 | Higuchi | 192/84 C |
| 3,863,743 | 2/1975 | Rule | 192/84 C |
| 4,187,939 | 2/1980 | Silvestrini et al. | 192/84 C |
| 4,432,446 | 2/1984 | Okano et al. | 192/84 C |
| 4,574,930 | 3/1986 | Koitabashi | 192/84 C |
| 4,973,870 | 11/1990 | Uehara | 192/84 C X |
| 5,036,964 | 8/1991 | Booth et al. | 192/84 C |
| 5,046,594 | 9/1991 | Kakinuma | 192/84 C |
| 5,059,842 | 10/1991 | Uehara | 192/84 C X |

FOREIGN PATENT DOCUMENTS 0003332 1/1989 Japan .................. 192/84 C
0266324 10/1989 Japan .................. 192/84 C Primary Examiner—Leslie A. Braun
Assistant Examiner—Andrea Pitts
Attorney, Agent, or Firm—Reising, Ethington, Barnard, Perry & Milton

[57] ABSTRACT

An electromagnetic clutch 11 including a rotor assembly 14 with an attraction surface 14d, a field coil assembly with an electromagnetic coil 15 and a coil support yoke 16, and an armature assembly 19. The armature assembly has an armature hub 20 which can be connected to a driven shaft 18, a stopper plate 21 connected to the hub 20, a ring shaped armature 24 and a damper which connects the armature to the stopper plate. The damper has a rubber damper 27 which is held in a damper cover 30a, 30b or 125b. The damper cover includes an open side with bevelled edges. The bevelled edges have an arc-shaped area 30e, 30f or 125c that prevents stress contractions in the end of the rubber damper 27 or 126 to prevent cracking of the vulcanized rubber. A rivet 25 or 124 may also be in the rubber damper. A free end of the rivet has a bevelled arc-shaped area 25a or 124a that limits stress concentrations to prevent cracking of the rubber damper 27 or 126. The bevelled areas prevent cracking of the rubber damper without increasing the axial length of the electromagnetic clutch 11.

7 Claims, 4 Drawing Sheets

ELECTROMAGNETIC CLUTCH

TECHNICAL FIELD

This invention pertains to an electromagnetic coupling device which connects and disconnects a rotating torque transmission device and a driven device by magnetizing and demagnetizing an electromagnetic coil.

BACKGROUND OF THE INVENTION

Electromagnetic clutches and brakes are used extensively in a variety of machines. They are used in stationary machines and on vehicles. Use on vehicles includes drives for air conditioning system compressors, air compressors, and mechanical superchargers. These clutches can take many forms. Most of the clutches include a field coil assembly, a rotor assembly and an armature assembly.

The field coil assembly is often mounted in a fixed position. A rotor assembly is rotatably mounted adjacent to the field coil in a position to form a portion of a magnetic flux path. The rotor assembly includes a drive engaging means such as a v-belt or power band engaging surface, a sprocket for a chain drive or a gear for gear drive. The rotor assembly also has an attraction surface. The armature assembly includes an armature hub, a stopper plate, an armature and a damper. The armature hub is adapted for mounting on a driven shaft. The stopper plate is attached to the armature hub and has generally radially extending arms which support the armature. There are usually three arms that support the armature in three places. The number of arms can vary. The damper includes rubber members which connect the armature to the arms of the stopper plate. The rubber members allow the armature to move into contact with the attraction surface on the rotor assembly when the field coil assembly is energized. The rubber members in the damper pull the armature away from the attraction surface when power to the field coil assembly is cut off. The damper assembly also deforms and absorbs the sudden increases in torque when the field coil assembly is energized. In addition to the high peak torques that are absorbed by the damper assembly when the field coil is energized, the damper assembly absorbs torsional vibrations from the power source and from the driven machine.

The rubber members included in the damper tend to crack, around the outside edges where the rubber contacts a metal retainer and in the center where the rubber contacts a central support post. The cracks in the rubber members lead to deterioration and a shortened useful life for the dampers and armature assemblies.

The life of the armature assemblies and the dampers, which are an integral part of the armature assemblies, can be extended by increasing the length of the metal parts to provide space for rubber filets that adhere to the metal parts when the rubber is vulcanized. The increase in the length of metal surfaces increases the axial length of the armature assembly. The increased axial length of the armature assembly is unacceptable in many vehicle installations due to the limited space available in vehicle engine compartments.

SUMMARY OF THE INVENTION

An object of the invention is to provide an electromagnetic clutch with a short axial length.

Another object of the invention is to provide an electromagnetic clutch with an armature assembly that includes a damper with a long useful life.

The electromagnetic coupling device includes a field coil assembly, a rotor assembly and an armature assembly. The field coil assembly is mounted in a fixed position on or adjacent to a driven unit such as a compressor. The rotor assembly is rotatably journalled on a support member adjacent to the field coil assembly. The armature assembly includes an armature hub mounted on a driven shaft, a stopper plate secured to the armature hub, an armature and a damper which connects the armature to the stopper plate and supports the armature adjacent to an attraction surface on the rotor assembly. The damper allows the armature to move axially into contact with the attraction surface on the rotor assembly when the field coil assembly is energized and pulls the armature out of contact with the attraction surface when the field coil assembly is not energized. The damper also absorbs torque changes and torsional vibrations. Attraction noise that can occur when the armature is pulled into contact with the attraction surface on the rotor assembly is essentially eliminated by the damper.

The armature assembly includes a damper with a holding device with an open end that is bevelled outwardly in an arc-shape. The outwardly bevelled surface of the holding device contacts the rubber portion of the damper. A post member that is embedded in the center portion of the rubber element has an arc-shaped bevelled edge on its unsupported end. The arc-shaped bevelled end reduces the diameter of the end of the post member.

The holding devices for the rubber element can be part of the stopper plate or part of the armature. Mounting arrangements for the holding devices are provided which have minimal axial thickness without decreasing the axial thickness of the rubber element.

The foregoing and other objects, features and advantages of the present invention will become apparent in light of the following detailed description of exemplary embodiments thereof as illustrated in the accompanying drawing.

BEST MODE FOR CARRYING OUT THE INVENTION

Figure 1:
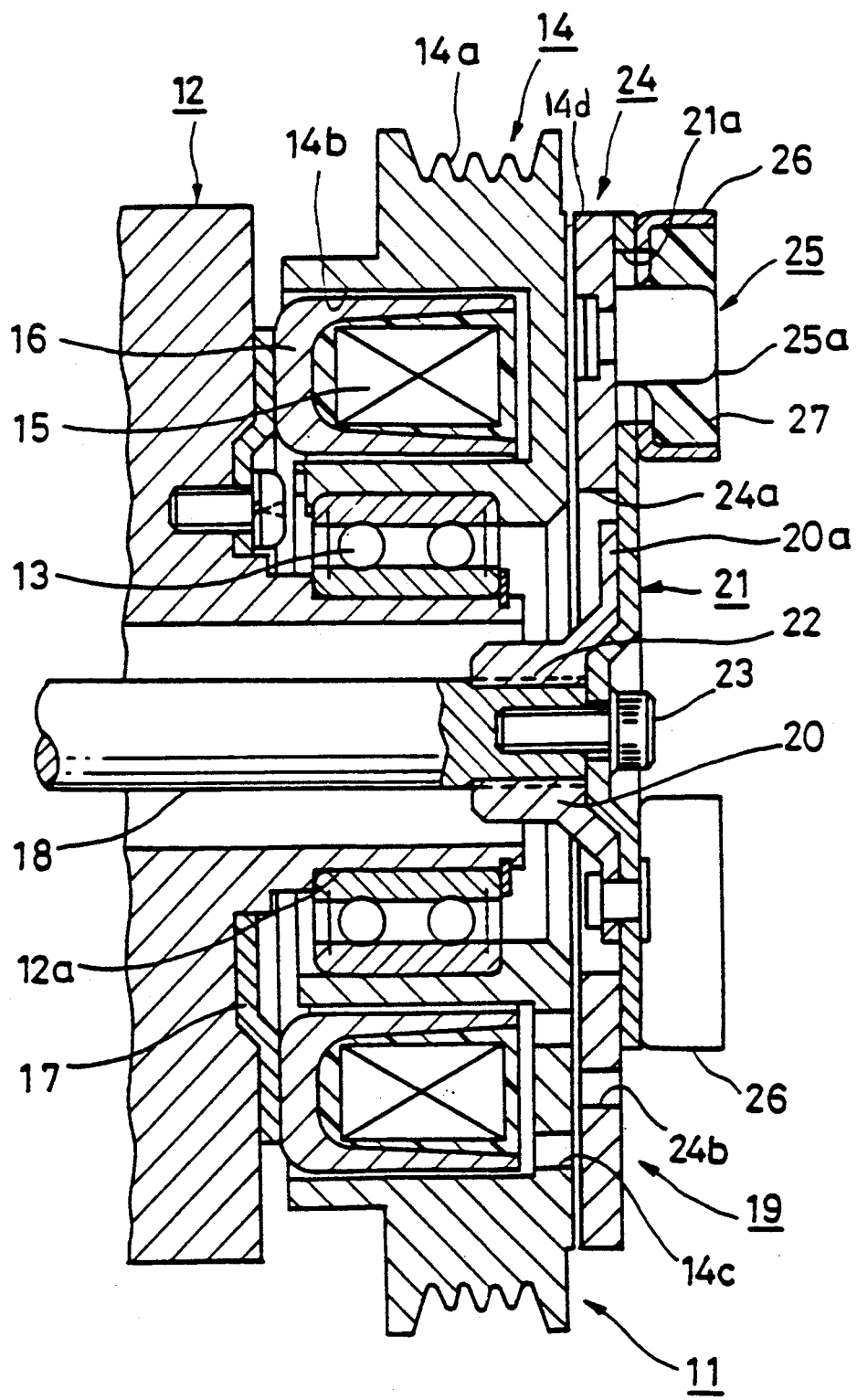
FIG. 1 is a cross-sectional view of an electromagnetic clutch that embodies the invention.

The electromagnetic clutch 11 as shown in FIG. 1 includes a rotor assembly 14 rotatably mounted on a cylindrical member 12a, that protrudes from a compressor 12, by a bearing 13. A plurality of v-grooves 14a are provided on the outside of the rotor assembly 14. A pulley with v-grooves that match v-grooves 14a is provided on and driven by an engine. A power band belt is trained around the rotor assembly 14 and the engine driven pulley to drive the rotor assembly 14. The engine, and the power band belt are not shown in the drawing.

A field coil assembly including a toroidal electromagnetic coil 15 is mounted inside a yoke 16. The yoke 16 is a toroidal shaped member with a U-shaped cross-section. An attachment plate 17 is secured to the yoke 16 and bolted to the compressor 12. The attachment plate 17 supports the yoke 16 and the toroidal electromagnetic coil 15 inside a ring groove 14b in the rotor assembly 14. The rotor assembly 14 rotates about the axis of a driven shaft 18 and the toroidal yoke 16 is concentric with the cylindrical member 12a so that the electromagnetic coil 15 remains stationary and the rotor assembly 14 is free to rotate.

The armature assembly 19 includes an armature hub 20 that is attached to a driven shaft 18 of a compressor by a bolt 23. The armature hub 20 and the driven shaft 18 have splines 22 that prevent relative rotation between the armature hub and the driven shaft. A stopper plate 21 is rigidly secured to the armature hub 20 by rivets or other attaching means. The stopper plate 21 can have a triangle shape, a disc shape or other appropriate shape. An armature 24, which is shaped into a disk with a cylindrical hole 24a that is larger in diameter than a flange 20a of the armature hub 20, is held by the stopper plate 21 and positioned between the stopper plate and the attraction surface 14d on the rotor 14. The armature 24 is connected to stopper plate 21 by a damper. The damper includes three damper elements. Each damper element includes a circular cup-shaped damper cover 26, a rivet 25 and a rubber damper 27. The rubber damper 27 is vulcanized inside the damper cover 26 and with the rivet 25 in the center of the rubber damper. The damper cover 26 is attached to the stopper plate 21 with the rivet 25 extending through a hole 21a in the stopper plate 21. The hole 21a is substantially larger in diameter than the rivet 25. The rivet 25 is rigidly secured to the armature by swaging. An arc-shaped bevelled area 25a is provided on the end of the rivet 25 that is in the rubber damper 27. The rivet 25 is set so that the end with the bevelled area 25a and the rubber damper 27 cooperate to make a flat surface. Holes 14c and 24b in the attraction surface 14d of the rotor assembly 14 and the armature 24 are magnetism stopping holes which detour the magnetic flux.

During operation of the electromagnetic coupling device shown in FIG. 1, electricity is supplied to the electromagnetic coil 15. Magnetic flux is generated through the yoke 16, the rotor assembly 14, the armature 24 and the yoke 16. The armature 24 will be pulled toward the attraction surface 14d, the rubber dampers 27 will deform and the armature 24 will magnetically adhere to the attraction surface 14d of the rotor assembly 14. Torque, supplied to the rotor assembly 14 by an engine, will be transferred from the attraction surface 14d to the armature 24, to the rivet 25, to the rubber damper 27, to the damper cover 26, to the stopper plate 21, to the armature hub 20 and to the driven shaft 18. If sufficient torque is applied to the rotor assembly 14, the rotor assembly will rotate and the driven shaft 18 will rotate. The rubber damper 27 will dampen torsional vibrations from the drive for the rotor assembly 14 or from the driven shaft 18.

Figure 2:
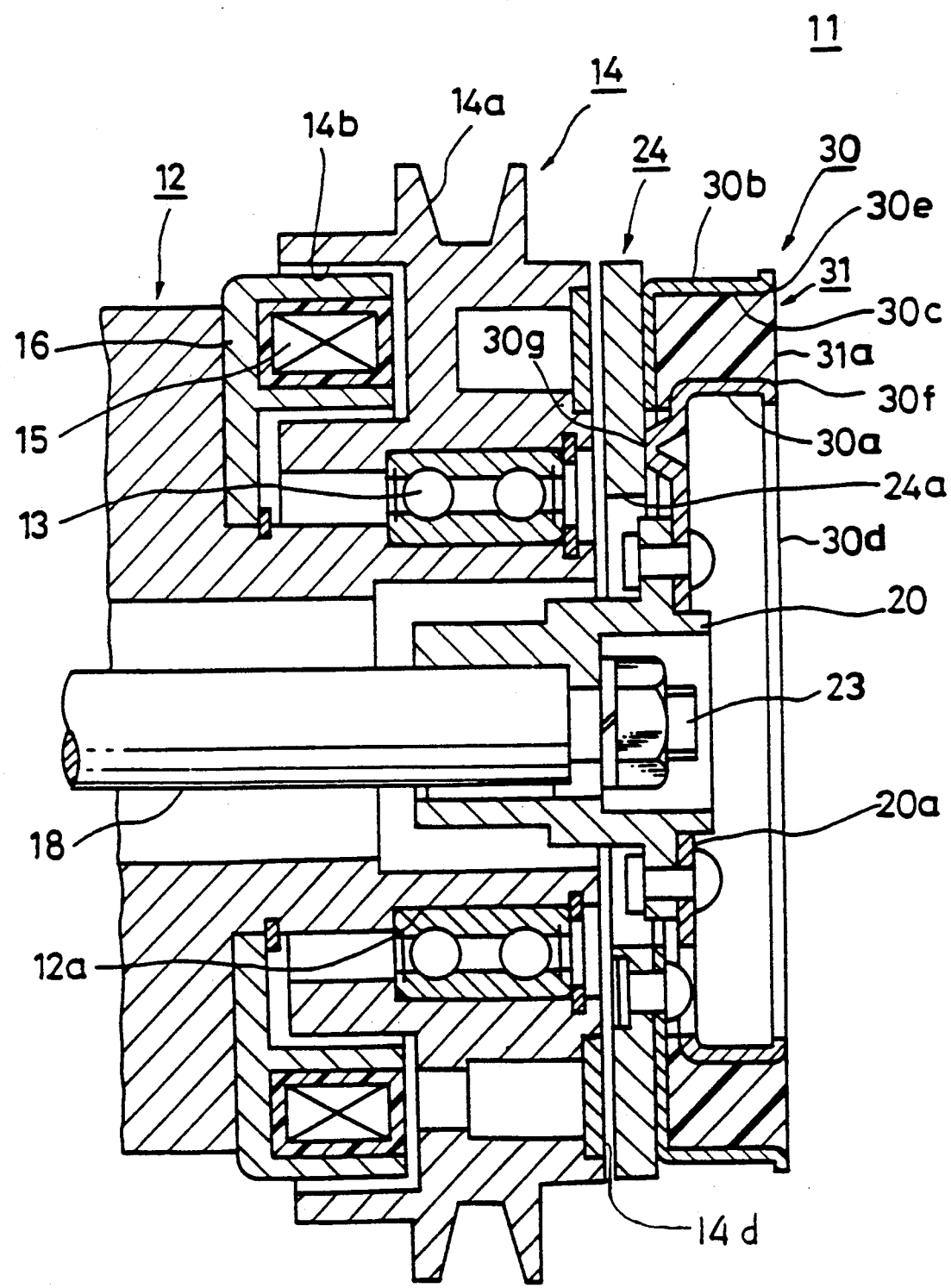
FIG. 2 is a cross-sectional view of another embodiment of the invention.

Another electromagnetic clutch, which employs the invention is shown in FIG. 2. The same reference numbers are used in FIG. 2 that were used in FIG. 1 for parts that are similar. An abbreviated explanation is given for members in FIG. 2 which have nearly the same structure and function as members shown in FIG. 1. A yoke 16 is used to secure an electromagnetic coil 15 on the compressor 12 with the electromagnetic coil positioned inside a ring-shaped groove 14b in the rotor assembly 14. The rotor assembly 14 is rotatably supported by a cylindrical member 12 on the compressor 12.

The armature assembly includes an armature hub 20 attached to the driven shaft 18 by a fastener 23. The stopper plate 30 includes an inner member 30a that is attached to a flange 20a on the armature hub 20 by rivets. The stopper plate 30 also includes a plate-shaped outer member 30b which is larger in diameter than the inner member 30a. An armature 24 is riveted to the plate-shaped outer member 30b of the stopper plate 30. The outer member 30b and the inner member 30a have axially extending spaced apart members which define a ring-shaped empty space which receives a ring-shaped rubber damper 31. Bevelled arc-shaped edges 30e and 30f are provided on the edge portions of the inner member 30a and the outer members 30b that define the ring-shaped space that receives the rubber damper 31. The rubber damper 31 is shaped to cooperate with the bevelled edges 30e and 30f to form a flat surface on the end face 31a. The inner member 30a also includes a stop surface 30g which contacts the armature 24 to limit movement of the armature away from the attraction surface 14d.

The operation of the armature assembly shown in FIG. 2 is substantially the same as operation of the armature assembly shown in FIG. 1. The bevelled surfaces at 30e and 30f and the portions of the rubber damper 31 which are in contact with the bevelled surfaces avoid stress concentrations which cause cracking of the rubber damper.

Figure 3:
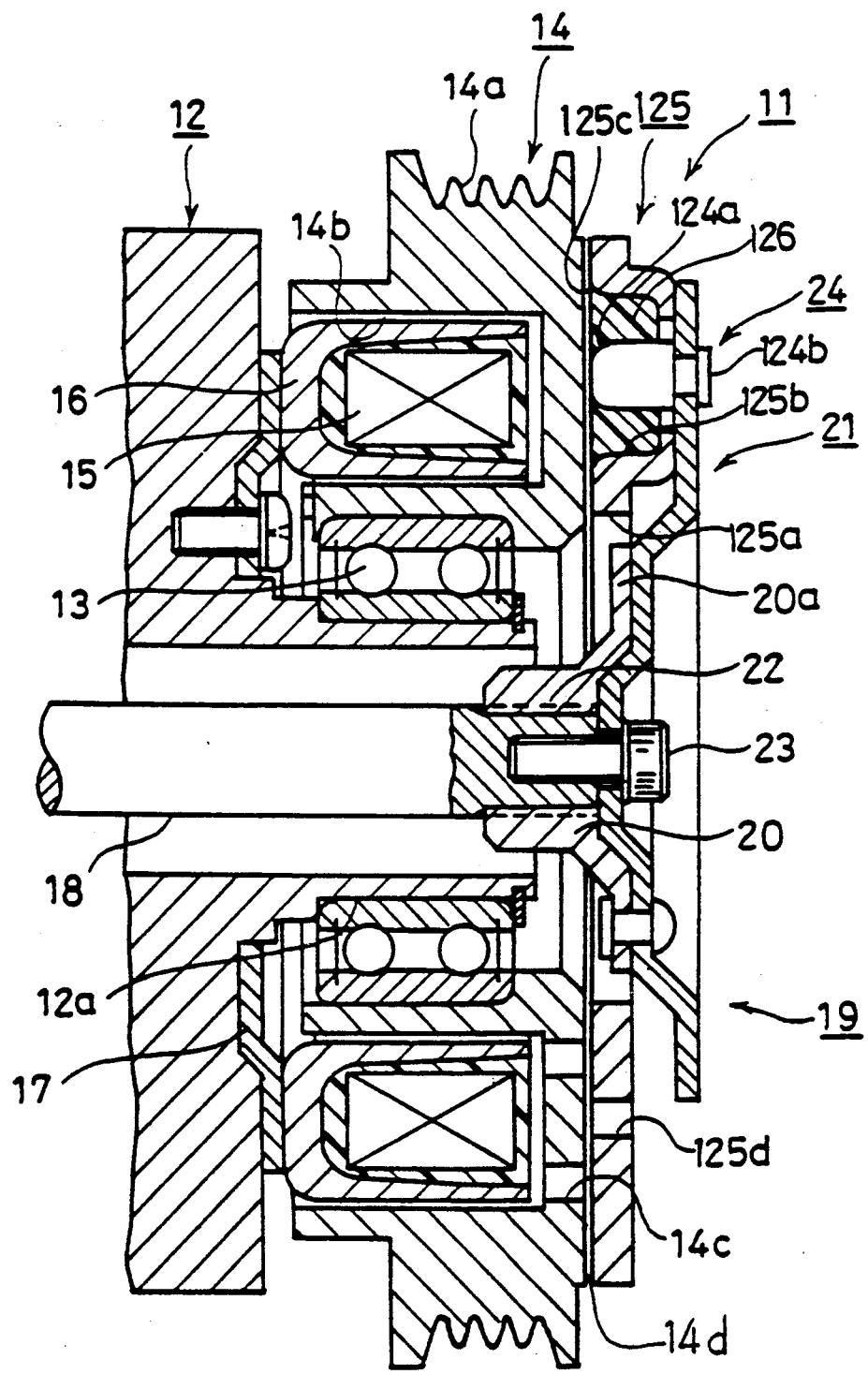
FIG. 3 is a cross-sectional view of a further embodiment of the invention.

The electromagnetic clutch shown in FIG. 3 employs another version of the clutch. This version is substantially identical to FIG. 1 except for the armature assembly 19. The armature assembly 19 includes an armature hub 22 and a stopper plate 21 that is fastened to a flange 20a by rivets. Three cup-shaped areas 125b are formed in the armature 25 by a plasticizing technique. The cup-shaped areas 125b have bevelled edges 125c with arc-shapes at the open edge that face the attraction surface 14d. A rubber damper 126 is vulcanized inside each of the cup-shaped areas 125b. A rivet 124 with a bevelled arc-shaped end 124a is also positioned in the center of the rubber damper 126 when the damper is vulcanized. The rivet 124 extends through the center of a large aperture in the armature 125 and is held to the stopper plate 21 by an enlarged end at 124b formed by swaging.

Apertures 14c and 125d in the attraction surface and in the armature 125 are magnetic flux stopping holes which change the magnetic flux path.

Figure 4:
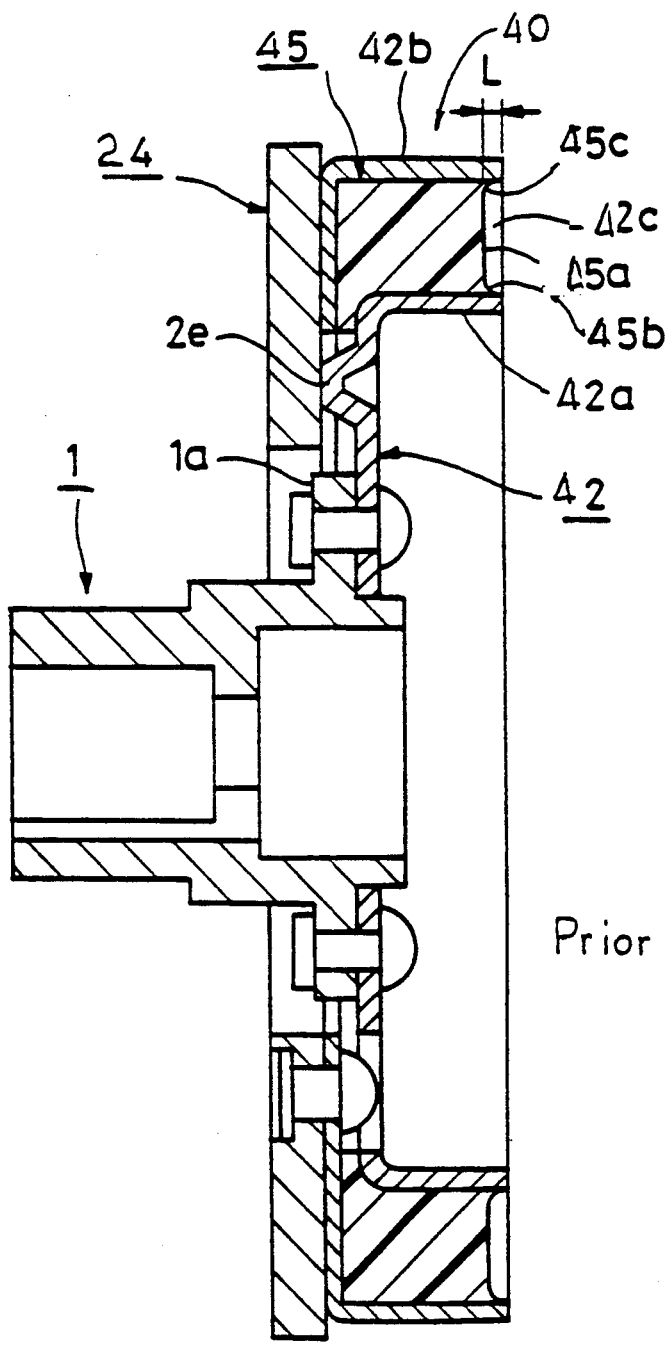
FIG. 4 is a cross-sectional view of a prior art armature assembly.

FIG. 4 shows a prior art armature assembly 40 which is similar to the armature assembly shown in FIG. 2. The stopper plate 42 with an inner member 42a and an outer member 42b. The inner member 42a is riveted to an armature hub 20. An armature 24 is attached to the outer member 42b by rivets. The inner and outer members 42a and 42b of the stopper plate 42 have concentric, axially extending and spaced apart walls which define an annular space. A rubber damper 45 is vulcanized in the annular space and connects the outer member 42b of the stopper plate 42 to the inner member 42a. The forward surface 45a of the rubber damper 45 is recessed inward from the forward edges of the stopper plate 42. The recess provides space for the bevelled arcuate filets 45b and 45c. The filets 45b and 45c reduce stress concentrations and eliminate or reduce cracking of the rubber damper 45. However, the construction increases the axial length of the armature assembly 40 by a distance L shown in the drawing. This increase in length renders the armature assembly 40 unusable in some installations. The armature assembly 19 disclosed in FIG. 2 incorporating the invention is shorter than the unit shown in FIG. 4 by the distance L. The armature assemblies in FIGS. 1 and 3 are shortened by the same distance L.

Preferred embodiments of the invention, which have been described in detail, are examples only and the invention is not restricted thereto. It will be easily understood by those skilled in the art that modifications and variations can easily be made within the scope of the invention:

We claim:

1. An electromagnetic clutch for transmitting torque between a first torque transmission member and a second torque transmission member that rotates about a fixed axis including a rotor assembly with an attraction surface; a field coil assembly with an electromagnetic coil and an electromagnetic coil support which supports the field coil adjacent to the rotor assembly; and an armature assembly including an armature hub attached to the second torque transmission member, a stopper plate rigidly secured to the armature hub, an armature positioned between the stopper plate and the attraction surface on the rotor assembly and a damper connecting the armature to the stopper plate characterized by the damper assembly including a rubber damper supported by a damper cover with an open side that includes bevelled edge surfaces adjacent to the open side that increases the space for the rubber damper, reduces stress concentrations in the end of the rubber damper and eliminates cracking of the rubber damper.

2. The electromagnetic clutch of claim 1 wherein the damper is further characterized by a rivet with a post section that is embedded in the rubber damper and wherein a free end of the post section includes a bevelled area that reduces the diameter of the post section, reduces stress concentrations in the rubber damper and eliminates cracking of the rubber damper.

3. The electromagnetic clutch of claim 3 wherein the damper cover has a central opening opposite said open side and is secured to the stopper plate and the end of the rivet with a post section remote from said free end passes through the central opening in the damper cover and is attached to the armature.

4. The magnetic clutch of claim 1 wherein the rubber damper is a ring-shaped member and the damper cover is formed by an inner member of the stopper plate and an outer member of the stopper plate and the armature is secured to the outer member of the stopper plate.

5. The electromagnetic clutch of claim 1 wherein the damper cover is formed in the armature with its open end with bevelled edge surfaces adjacent to the attraction surface and wherein a rivet with a post section is embedded in the rubber damper, passes through an opening in the armature and is rigidly secured to the stopper plate.

6. An electromagnetic clutch, for transmitting torque between a first torque transmission member and a second torque transmission member that rotates about a fixed axis, including a rotor assembly rotatable about the axis of the second torque transmission member, having an engagement member which engages the first torque transmission member and having an attraction surface that is in a plane which is generally perpendicular to the fixed axis of the second torque transmission member; a field coil assembly with an electromagnetic coil and an electromagnetic coil support which supports the field coil adjacent to the rotor assembly; an armature assembly including an armature hub attached to the second torque transmission member and rotatable about said fixed axis of the second torque transmission member, a stopper plate rigidly secured to the armature hub, an armature positioned between the stopper plate and the attraction surface on the rotor assembly and three or more damper assemblies connecting the armature to the stopper plate characterized by each damper assembly including a cup-shaped damper cover with a bottom wall, side walls, an open side that faces away from the armature, bevelled edge surfaces on the side walls of the cup-shaped damper cover adjacent to the open side that form a curve inside lip in the damper cover and increases the volume of the damper cover, an opening in the bottom wall of the damper cover, a post attached to the armature and extending through the opening in the bottom wall of the damper cover and into the damper cover, a bevelled area on a free end of the post that reduces the diameter of the post, and a vulcanized rubber damper which surrounds the post substantially fills the damper cover and adheres to the curved inside lip in the damper cover and the bevelled area on the free end of the post thereby forming a vulcanized rubber damper edge that reduce stress concentrations in the end of the rubber damper and eliminate cracking of the rubber damper.

7. An electromagnetic clutch, for transmitting torque between a first torque transmission member and a second torque transmission member that rotates about a fixed axis, including a rotor assembly rotatable about the axis of the second torque transmission member, having an engagement member which engages the first torque transmission member and having an attraction surface that is in a plane which is generally perpendicular to the fixed axis of the second torque transmission member; a field coil assembly with an electromagnetic coil and an electromagnetic coil support which supports the field coil adjacent to the rotor assembly; an armature assembly including an armature hub attached to the second torque transmission member and rotatable about said fixed axis of the second torque transmission member, a stopper plate rigidly secured to the armature hub, an armature positioned between the stopper plate and the attraction surface on the rotor assembly and three or more damper assemblies connecting the armature to the stopper plate characterized by each damper assembly including a cup-shaped damper cover with a bottom wall, side walls, an open side that faces away from the armature, an opening in the bottom wall of the damper cover, a post attached to the armature and extending through the opening in the bottom wall of the damper cover and into the damper cover, a bevelled area on a free end of the post that reduces the diameter of the post, and a vulcanized rubber damper which surrounds the post substantially fills the damper cover and adheres to the bevelled area on the free end of the post thereby forming a vulcanized rubber damper edge that reduces stress concentrations in the end of the rubber damper and eliminate cracking of the rubber damper.

* * * * *

UNITED STATES PATENT AND TRADEMARK OFFICE
CERTIFICATE OF CORRECTION

PATENT NO. : 5,184,705

DATED : February 9, 1993

INVENTOR(S) : Sekiguchi, deceased et al.

It is certified that error appears in the above-identified patent and that said Letters Patent is hereby corrected as shown below:

Column 5, line 44, delete "3" and insert -- 2 --.

Signed and Sealed this

Eighth Day of November, 1994

Attest:

*Attesting Officer*

BRUCE LEHMAN

*Commissioner of Patents and Trademarks*